Aug. 7, 1945.  R. A. GOEPFRICH ET AL  2,381,737
BRAKE
Filed Dec. 29, 1943  4 Sheets-Sheet 1

INVENTORS
RUDOLPH A. GOEPFRICH
BRYAN E. HOUSE
BY
T. J. Plante
ATTORNEY

Aug. 7, 1945. R. A. GOEPFRICH ET AL 2,381,737
BRAKE
Filed Dec. 29, 1943 4 Sheets-Sheet 3

INVENTORS
RUDOLPH A. GOEPFRICH
BRYAN E. HOUSE
BY
T. J. Planti
ATTORNEY

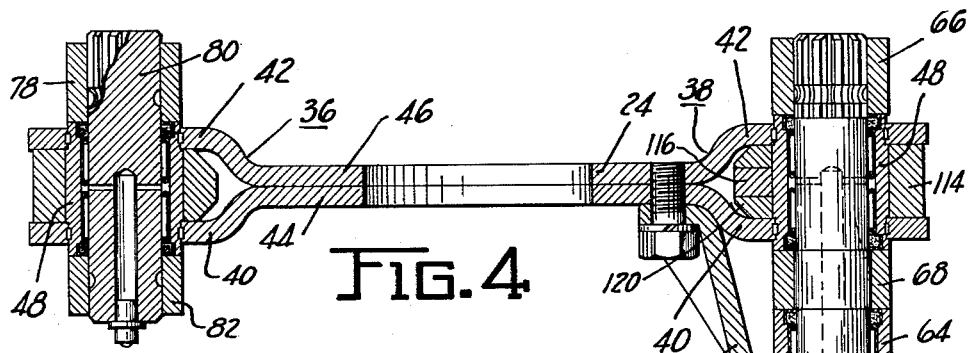
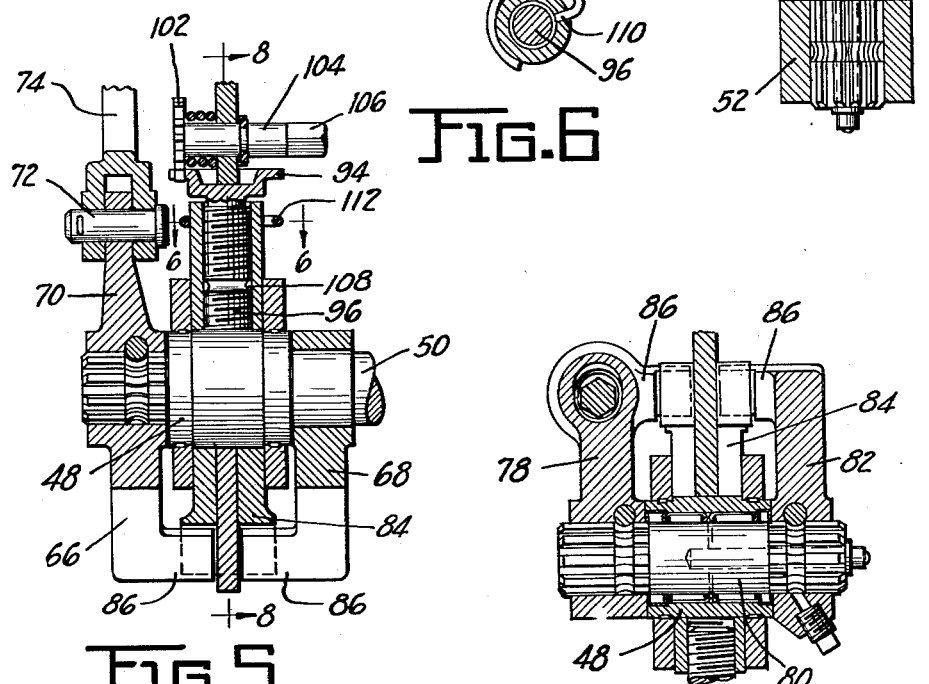

Patented Aug. 7, 1945

2,381,737

UNITED STATES PATENT OFFICE 2,381,737

BRAKE

Rudolph A. Goepfrich and Bryan E. House, South Bend, Ind., assignors to Bendix Aviation Corporation, South Bend, Ind., a corporation of Delaware Application December 29, 1943, Serial No. 516,020

13 Claims. (Cl. 188—78)

This invention relates to brakes and is illustrated as embodied in a drum brake of the internal expanding shoe type.

An object of the present invention is to provide improved mechanical applying means for the shoe or shoes of a brake.

A further object of the present invention is to provide improved mechanical applying means for a brake of the type having two shoes which are individually capable of anchoring at either end depending upon the direction in which the brake drum is rotating.

A still further, and more specific, object of the present invention is to provide a mechanically applied brake wherein both the anchoring force and the applying force act substantially centrally of the anchor and the applying mechanism, respectively; thus avoiding cantilever loading of these parts, and consequent tendency to deflection thereof.

Application Serial No. 512,429, filed by Rudolph A. Goepfrich on December 1, 1943, discloses a mechanically applied brake wherein both the anchoring force and the applying force act substantially centrally of the anchor and the applying mechanism, respectively.

It is an object of the present invention to provide a mechanically applied brake which will have the advantages of the brake disclosed in the aforesaid Goepfrich application, while being simpler in construction, less costly to manufacture, and better adapted to efficient manufacturing processes.

Other objects and advantages of the present invention will become apparent during the course of the following description, reference being had therein to the accompanying drawings, in which.

Figure 1:
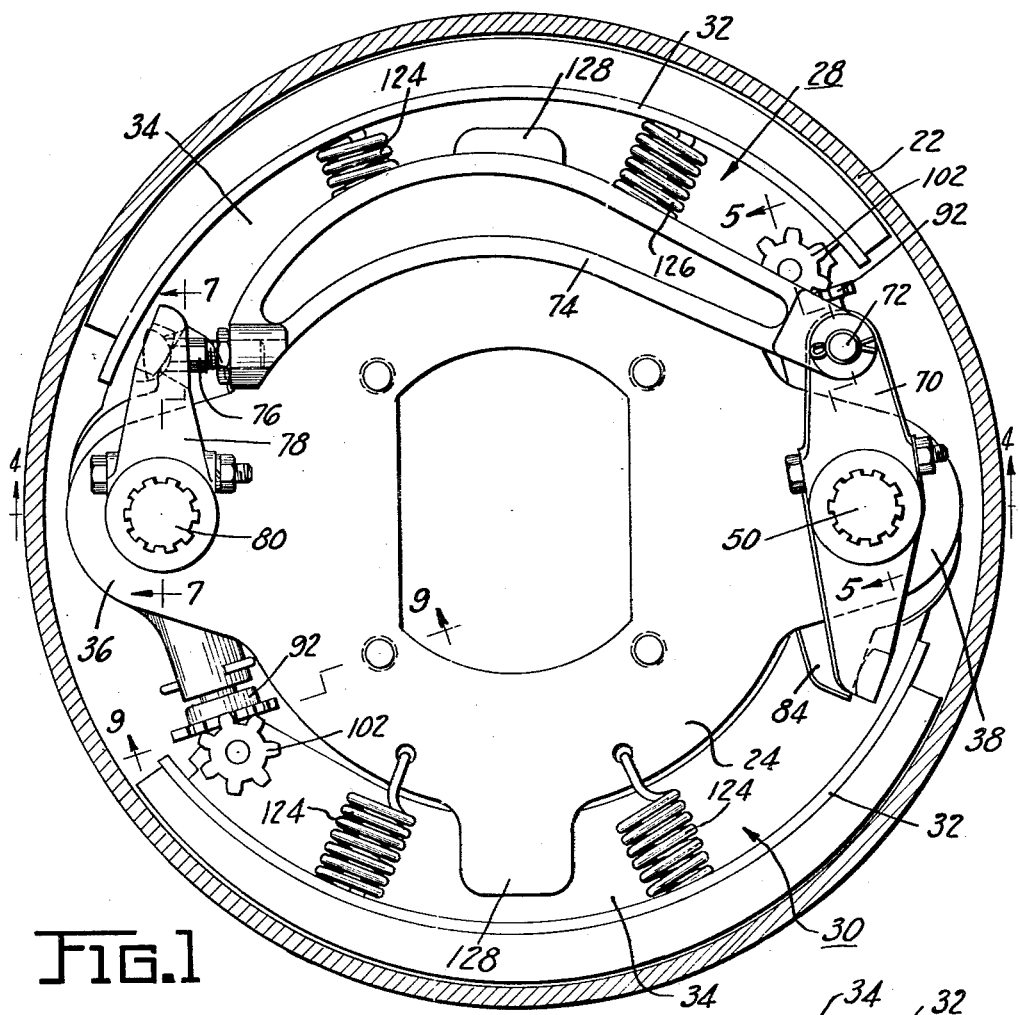
Fig. 1 is a front view of a brake assembly incorporating our invention.
Figure 9:
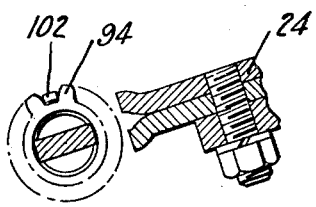
Figures 3, 8:
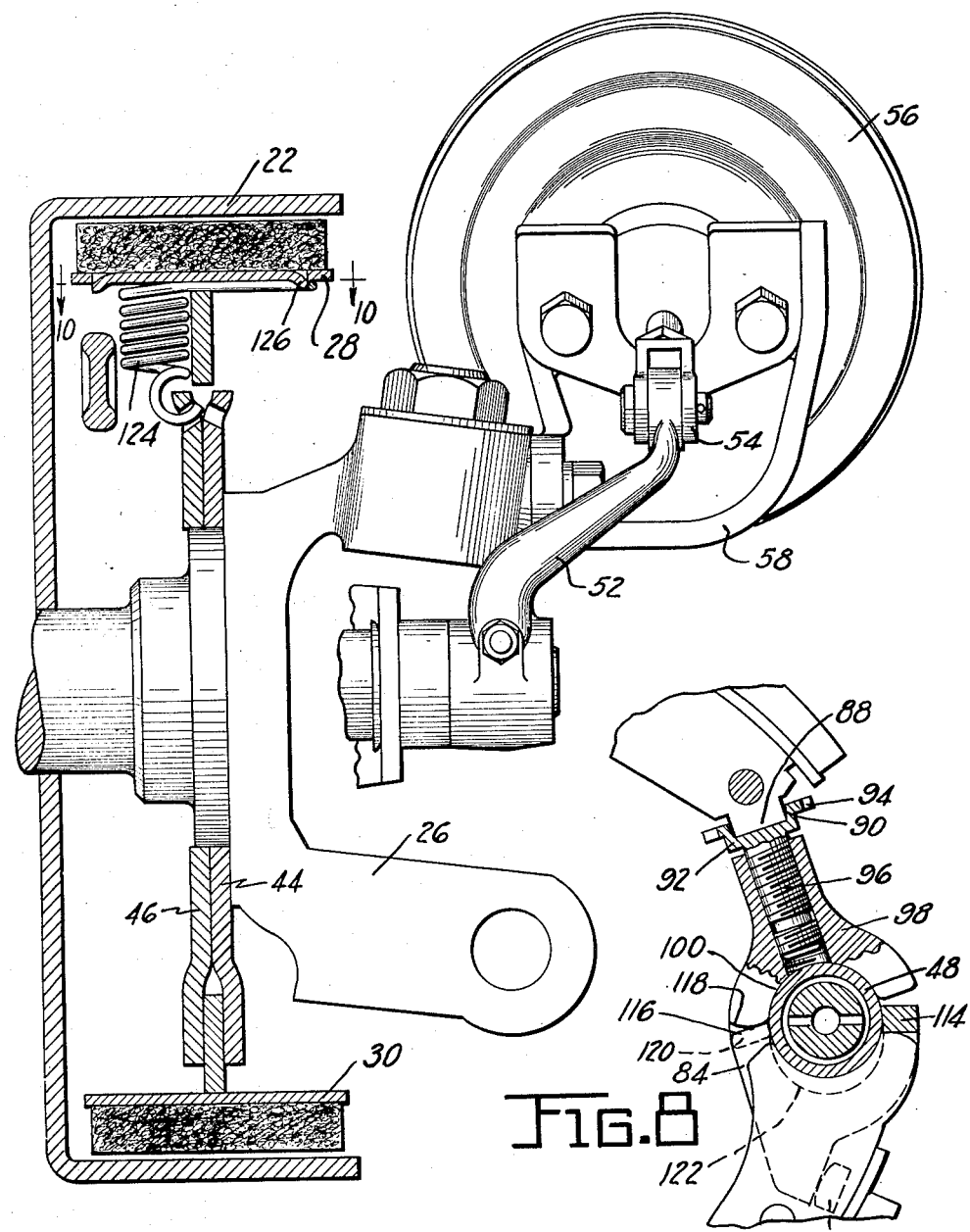
Fig. 3 is a side view of said brake assembly, showing part of the brake in section.

Figs. 4 and 5 are sections taken on the lines 4—4 and 5—5, respectively, of Fig. 1;

Fig. 6 is a section taken on the line 6—6 of Fig. 5;

Fig. 7 is a section taken on the line 7—7 of Fig. 1;

Fig. 8 is a section taken on the line 8—8 of Fig. 5;

Fig. 9 is a section taken on the line 9—9 of Fig. 1; and

Figure 10:
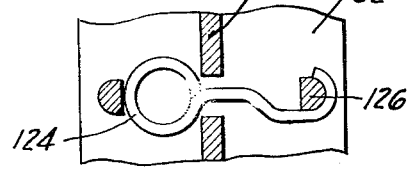

Fig. 10 is a section taken on the line 10—10 of Fig. 3.

The illustrated brake is of the type having two shoes which are individually shiftable to anchor at either end depending upon the direction of drum rotation. The principles of our invention are particularly useful in a brake having this arrangement. However, our invention may also be of value in connection with other types of brake.

Figure 2:
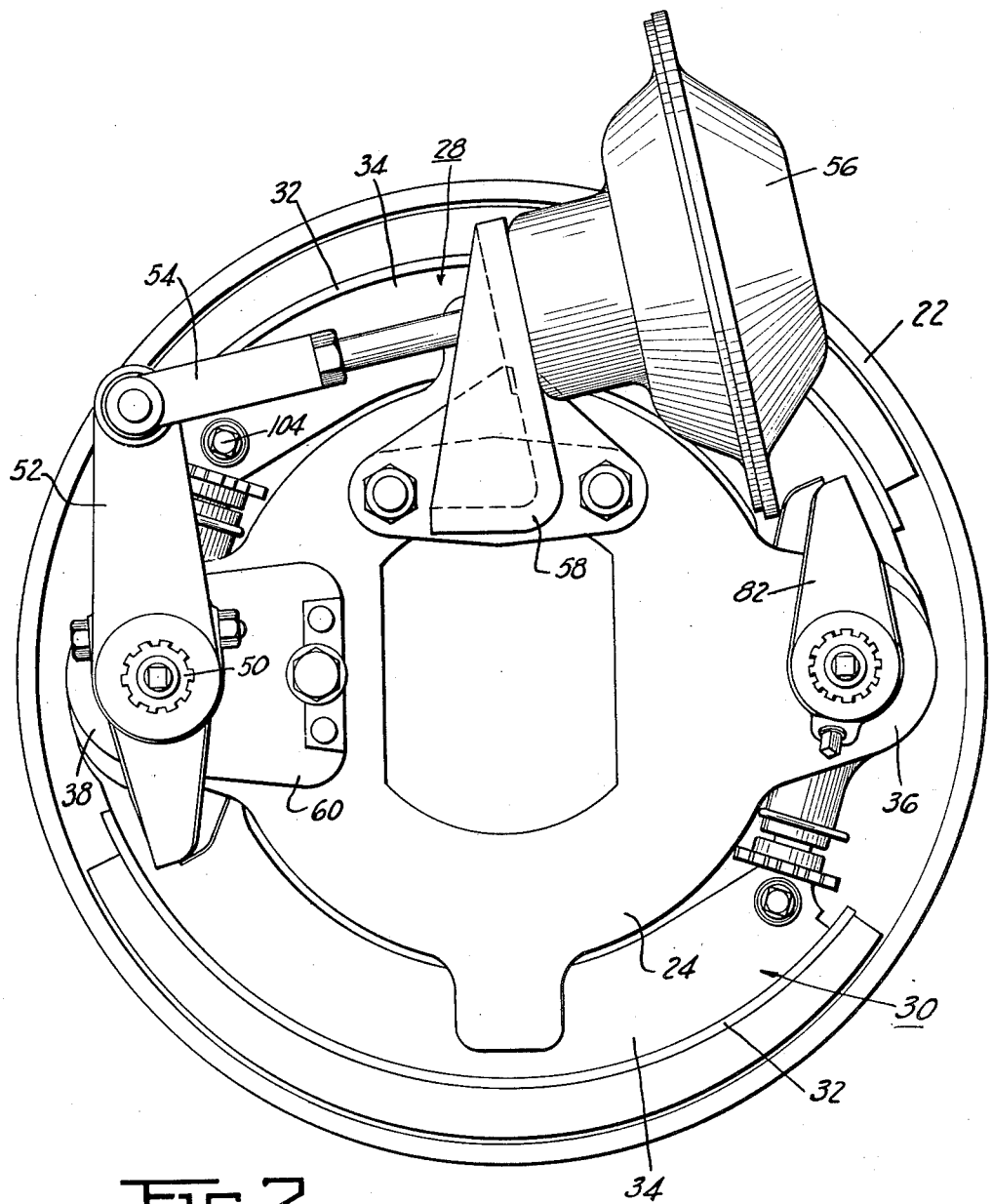
Fig. 2 is a rear view of the brake assembly of Fig. 1.

In the drawings (see particularly Figs. 1 and 2) the rotatable brake drum is indicated at 22. A non-rotatable supporting member 24 is secured by suitable means to a non-rotating part of the vehicle, such as the steering knuckle 26 (see Fig. 3). Two shoes 28 and 30, each of which comprises a lined rim 32 facing the drum and a web 34 normal to the rim, are adapted to contact the drum and to transmit the braking torque therefrom to the support member 24 by means of either one or the other of the diametrically opposite pairs of projections extending radially outward from the support member 24. In Figs. 1 and 2, the pair of projections at one side of the brake is indicated generally by the numeral 36, and the pair of projections at the opposite side of the brake is indicated generally by the numeral 38.

As shown particularly in Figs. 4, 5 and 7, each pair of projections includes a projection 40 and a projection 42 axially spaced therefrom. The projections 40 may form part of a generally plate-shaped member 44, and the projections 42 may form part of a generally plate-shaped member 46, the centers of the two plates being secured together by the same means which secures the support member to a non-rotating part of the vehicle. In each case, the projections are axially offset from the plane of the central portion of the plate-like member.

An anchor which extends parallel to the axis of the brake is supported between the projections 40 and 42, at each side of the brake. As seen most clearly in Figs. 4, 5, 7 and 8, each anchor comprises a sleeve 48 extending through openings in both of the projections 40 and 42. Each of the anchoring sleeves 48 has a shaft journaled therein and adapted to be turned to move the brake shoes into contact with the drum. In the illustrated brake, one of the shafts is somewhat longer than the other, owing to the fact that only one of the shafts is connected to the source of brake applying pressure. The shaft which is connected to said source of brake applying pressure is the relatively long shaft 50, shown at the right side of both Figs. 1 and 4. The outer end of the shaft 50 is adapted to be connected, preferably by means of a splined connection, with an arm 52, which is in turn connected (see Fig. 2) by means of a rod 54 with a pressure applying device such as the compressed air diaphragm type cylinder 56. Obviously, any type of operating device could be used, such as a hydraulic cylinder, or mechanical linkage. The device 56 is mounted on the steering knuckle 26 by means of a mounting bracket 58.

Owing to the length of the shaft 50, it is desirable to provide an additional supporting bracket 60 secured to the support member 24, and having a radially extending arm 62 which supports an additional anchor sleeve 64, thus providing a support for the shaft 50 near the outer end thereof which is attached to the arm 52.

As seen best in Figs. 4 and 5, the shaft 50 has arms 66 and 68 secured thereto for rotation therewith, the arm 66 being on one side of the anchor sleeve 48 and the support projection 42, and the arm 68 being on the other side of the anchor sleeve 48 and the support projection 40, the arms thus in effect straddling the anchor. The arm 68 may be secured to the shaft before assembly by any suitable operation, such as welding. The arm 66 must be secured to the shaft 50 after the shaft has been placed in its position in the anchor sleeve, and accordingly a splined connection is used.

The arm 66 may have integral therewith an oppositely extending arm 70, which is connected by means of a pin 72 with a tension link 74 (see Fig. 1) which extends across the brake to exert an applying force at the opposite ends of the shoes simultaneously with the exertion of the applying force by the shaft 50.

The tension link 74 may be connected by means of a bolt 76 with an arm 78 which is splined to a shaft 80, this shaft being the shorter of the two shafts referred to as being journaled in the respective anchor sleeves 48. Referring to Fig. 1, the rotation of the shaft 80 is adapted to exert a spreading force between the left ends of the shoes, whereas rotation of the shaft 50 is adapted to exert a spreading force between the right ends of the shoes.

Except for the fact that the fluid pressure device 56 acts directly on the shaft 50, whereas the shaft 80 is turned by means of the tension link 74 which is connected to the shaft 50, the construction of the shoe applying devices driven by the respective shafts 50 and 80 is identical. The construction of the parts driven by shaft 50 is best seen in Fig. 5, as mentioned above, while the construction of the parts driven by shaft 80 is best seen in Fig. 7. It will be noted that, in addition to the arm 78, the shaft 80 has an arm 82 secured thereto, said arms being positioned on opposite sides of the anchor sleeve 48, just as in the case of the arms 66 and 68 driven by shaft 50.

Two forked shoe spreading levers 84 are provided, each adapted to spread the shoes at one side of the brake. One of the levers 84 has each of its forks or sides concurrently actuated by the arms 66 and 68 on the shaft 50, while the other lever 84 has each of its forks or sides concurrently actuated by the arms 78 and 82 on the shaft 80. In order to provide driving connections between the several arms and the respective levers, each of the arms 66, 68, 78 and 82 may have an inwardly projecting nib 86 in contact with the respective side of the respective lever 84. Thus, each pair of arms on each shaft is adapted to exert a balanced centered force on the respective lever 84, which in turn will exert a balanced centered force tending to spread the shoes at the respective side of the brake. The connection between the levers 84 and the ends of the shoes will be more fully explained after the structure of the shoes has been briefly discussed.

Each end of each shoe is adapted to anchor directly against the respective anchor sleeve 48, and, in release, the ends of the shoes are positioned by contact with said anchor sleeve. Both ends of both shoes contact the respective anchor sleeves 48, between the projections 40 and 42 of the supporting member 24. The anchoring torque of the shoes is thus taken centrally of the supporting projections, avoiding cantilever loading of said supporting projections or of the supporting member 24, the anchoring contact of the ends of the shoes with the anchor sleeves preferably being midway between the projections 40 and 42.

In order that the released positions of the shoes may be adjustable in order to compensate for lining wear, we prefer to provide an adjustable link in each shoe, the arrangement being such that, in one direction of rotation, each shoe anchors through its adjustable link. As seen in Fig. 1, the adjustable link of the shoe 28 is located at the right end of the shoe, while the adjustable link of the shoe 30 is located at the left end of that shoe. The two adjustable links are preferably identical, and may be constructed as shown in Fig. 8. In that figure it will be seen that a projection 88 on the end of the shoe web extends into a conical recess 90 formed at the top of an adjusting screw member 92, the head of said adjusting screw member being preferably toothed as shown at 94. The stem 96 of the screw is in threaded engagement with a cylindrical bore in the anchoring member 98, said anchoring member preferably being provided at the end away from the shoe with a substantially semi-circular surface 100 adapted to contact the anchor sleeve 48. As the head of the screw is rotated, the stem of the screw moves longitudinally in or out of the threaded bore, changing the distance between the anchoring member 98 and the shoe, and thus adjusting the radial position of the shoe. If desired, the adjusting procedure may be simplified by gearing the toothed head 94 of the adjusting screw to the complementary toothed head 102 of a stem 104 (see Figs. 5 and 9) extending normal to the stem 96. The stem 104 may be provided with an end portion 106 adapted to receive an adjusting tool, and conveniently located in an easily accessible place. If desired, an automatic limit to the amount of adjustment may be provided. In the present illustration this is done by cutting a groove 108 in the stem 96 of the adjusting screw, and arranging a stop 110 on the end of a spring 112 (see Fig. 6) in such a way that it will slip into the groove 108 whenever the amount of adjustment is sufficient to bring the groove into alignment with the stop 110.

The construction of the floating applying levers 84, which are preferably identical, is perhaps best illustrated in Fig. 8. The two forks or sides of the lever 84 may conveniently straddle the web of one of the brake shoes, the width of the anchoring member 98 on the end of the other brake shoe usually being appreciably greater than the thickness of the shoe web, and in the present illustration substantially equal to the total thickness of the shoe web and of the two sides of the lever 84 (see Fig. 5).

As illustrated in Fig. 8, the junction 114 between the two sides of the lever 84 is adapted to contact the web of the lower shoe and exert an applying force against said shoe. At the opposite side of the anchor sleeve 48, the end 116 of each fork of the lever 84 is in direct contact with a boss 118 on the anchoring member 98 of the upper shoe. Between the bosses 118 provided at the front and back of the left side of the member 98 there may be an extension 120 of said member 98 for the purpose of keeping the parts of the applying mechanism in proper alignment, and also for assuring that the member 98 cannot slip off the anchoring sleeve 48 when the upper shoe moves into the brake drum. The floating lever 84, as seen in Fig. 8, is actuated by the nibs 86 on the shaft arms. Movement of the arms, acting through the nibs 86, causes, as seen in Fig. 8, a clockwise movement of the floating lever 84, thus applying a force tending to spread the upper and lower shoes, the force against the lower shoe being exerted through the junction 114 and the force against the upper shoe being exerted through the edges 116. The inner edge 122 of lever 84 nearest the anchor sleeve 48 is spaced from the anchor sleeve in order to provide a clearance permitting the lever to move upward as the ends of the shoes are spread.

In order to normally maintain the shoes in released position a plurality of radially extending springs 124 may be used, said springs being connected to the supporting member 24 at one end, and being connected to the shoes by means of the projections 126 on the rims of the shoes (seen in Fig. 10). Furthermore, in order to maintain the shoes in proper lateral position, the plates 44 and 46 forming the central supporting member 24 may be provided with extensions 128 embracing the webs of the shoes intermediate the ends thereof.

When it is desired to operate the brake, the operating device 56 is actuated, turning the shaft 50, as seen in Fig. 1, in the clockwise direction, thereby simultaneously turning the arms 66 and 68, and exerting a force through the arm 70 and link 74 to turn the arms 78 and 82 of shaft 80. The pair of actuating arms on each shaft moves the respective floating lever 84, spreading the ends of the shoes as described above. It will be apparent that a force is simultaneously applied to both ends of both shoes tending to move them into contact with the brake drum. When the shoes come into contact with the drum, the direction of rotation of the drum causes them to anchor at one end or the other, and to be applied at the other end, in accordance with well known principles of brake operation. When the applying pressure is released, the shoes are returned to the original position (as seen in Fig. 1) by means of the return springs 124.

Although a particular embodiment of our invention has been described, it will be understood by those skilled in the art that the object of the invention may be attained by the use of constructions different in certain respects from that disclosed without departing from the underlying principles of the invention. We therefore desire by the following claims to include within the scope of our invention all such variations and modifications by which substantially the results of our invention may be obtained through the use of substantially the same or equivalent means.

We claim:

1. In a brake having a rotatable drum, a non-rotatable support member having a pair of aligned substantially radially extending projections spaced axially from one another, torque-taking means supported by said projections and extending parallel to the axis of the brake, and a shoe adapted to anchor on said torque-taking means, the web of said shoe contacting the torque-taking means between said axially spaced projections, means for moving said shoe into contact with the drum comprising a shaft journaled in said torque-taking means, and two aligned arms on said shaft straddling the web of the shoe and both rotating with said shaft to apply an axially centered balanced force tending to move the shoe into contact with the drum.

2. In a brake having a rotatable drum, a non-rotatable support member having a pair of aligned substantially radially extending projections spaced axially from one another, torque-taking means supported by said projections and extending parallel to the axis of the brake, and a shoe adapted to anchor on said torque-taking means, the web of said shoe contacting the torque-taking means midway between said axially spaced projections, means for moving said shoe into contact with the drum comprising a shaft journaled in said torque-taking means, and two aligned arms straddling said torque-taking means and both rotating with said shaft to apply an axially centered balanced force tending to move the shoe into contact with the drum.

3. In a brake having a rotatable drum, a non-rotatable support member having a pair of aligned substantially radially extending projections spaced axially from one another, torque-taking means supported by said projections and extending parallel to the axis of the brake, and a shoe adapted to anchor on said torque-taking means, the web of said shoe contacting the torque-taking means midway between said axially spaced projections, means for moving said shoe into contact with the drum comprising a shaft journaled in said torque-taking means, and two aligned arms straddling said axially spaced projections and both rotating with said shaft to apply an axially centered balanced force tending to move the shoe into contact with the drum.

4. In a brake having a rotatable drum, a non-rotatable support member having a pair of aligned substantially radially extending projections spaced axially from one another, torque-taking means supported by said projections and extending parallel to the axis of the brake, and a shoe adapted to anchor on said torque-taking means, the web of said shoe contacting the torque-taking means midway between said axially spaced projections, means for moving said shoe into contact with the drum comprising a shaft journaled in said torque-taking means, two aligned arms straddling the web of the shoe and both rotating with said shaft, and means on which a balanced force is exerted by the concurrent rotation of both of said arms and which in turn exerts an axially centered balanced force against the end of the shoe tending to move it into contact with the drum.

5. In a brake having a rotatable drum, a non-rotatable support member having a pair of aligned substantially radially extending projections spaced axially from one another, torque-taking means supported by said projections and extending parallel to the axis of the brake, and a shoe adapted to anchor on said torque-taking means, the web of said shoe contacting the torque-taking means midway between said axially spaced projections, means for moving said shoe into contact with the drum comprising a shaft journaled in said torque-taking means, two aligned arms straddling said torque-taking means and both rotating with said shaft, and means on which a balanced force is exerted by the concurrent rotation of both of said arms and which in turn exerts an axially centered balanced force against the end of the shoe tending to move it into contact with the drum.

6. In a brake having a rotatable drum, a nonrotatable support member having a pair of aligned substantially radially extending projections spaced axially from one another, torque-taking means supported by said projections and extending parallel to the axis of the brake, and a shoe adapted to anchor on said torque-taking means, the web of said shoe contacting the torque-taking means midway between said axially spaced projections, means for moving said shoe into contact with the drum comprising a shaft journaled in said torque-taking means, two aligned arms straddling said axially spaced projections and both rotating with said shaft, and means on which a balanced force is exerted by the concurrent rotation of both of said arms and which in turn exerts an axially centered balanced force against the end of the shoe tending to move it into contact with the drum.

7. In a brake having a rotatable drum, a nonrotatable support member having a pair of aligned substantially radially extending projections spaced axially from one another, torque-taking means supported by said projections and extending parallel to the axis of the brake, and a shoe adapted to anchor on said torque-taking means, the web of said shoe contacting the torque-taking means midway between said axially spaced projections, means for moving said shoe into contact with the drum comprising a shaft journaled in said torque-taking means, two aligned arms axially straddling said torque-taking means and both adapted to be rotated by rotation of said shaft, and a forked lever having contact with the web of the shoe at the junction of the forks and having each side thereof in contact with one of said arms.

8. In a brake having a rotatable drum, a nonrotatable support member having a pair of aligned substantially radially extending projections spaced axially from one another, torque-taking means supported by said projections and extending parallel to the axis of the brake, and a shoe adapted to anchor on said torque-taking means, the web of said shoe contacting the torque-taking means midway between said axially spaced projections, means for moving said shoe into contact with the drum comprising a shaft journaled in said torque-taking means, two aligned arms axially straddling said torque-taking means and both adapted to be rotated by rotation of said shaft, each of said arms having an inwardly projecting nib, and a forked lever having contact with the web of the shoe at the junction of the forks and having each side thereof in contact with the nib on one of said arms.

9. In a brake having a rotatable drum, a nonrotatable support member having a pair of aligned substantially radially extending projections spaced axially from one another, torque-taking means supported by said projections and extending parallel to the axis of the brake, and two shoes each adapted to anchor on said torque-taking means in one direction of rotation of the drum, the anchoring ends of said shoes contacting the torque-taking means midway between said axially spaced projections, means for moving said shoes into contact with the drum comprising a shaft journaled in said torque-taking means, two aligned arms straddling said torque-taking means and both adapted to be rotated by rotation of said shaft, and means on which a balanced force is exerted by the concurrent rotation of both of said arms and which in turn exerts an axially centered balanced force simultaneously against the end of both shoes tending to move them into contact with the drum.

10. In a brake having a rotatable drum, a nonrotatable support member having a pair of aligned substantially radially extending projections spaced axially from one another, torque-taking means supported by said projections and extending parallel to the axis of the brake, and two shoes each adapted to anchor on said torque-taking means in one direction of rotation of the drum, the anchoring ends of said shoes contacting the torque-taking means midway between said axially spaced projections, means for moving said shoes into contact with the drum comprising a shaft journaled in said torque-taking means, two aligned arms straddling said torque-taking means and both adapted to be rotated by rotation of said shaft, and a forked lever straddling the web of one of the shoes and having pivotal contact with the ends of the respective shoes at radially opposite sides of said torque-taking means, each side of the fork being in pivotal contact with one of said arms, whereby concurrent rotation of said arms exerts a force simultaneously on both sides of the forked lever, tending to turn said lever and thereby exerting an axially centered balanced force simultaneously against the end of both shoes tending to move them into contact with the drum.

11. In a brake having a rotatable drum, a nonrotatable support member providing torque-taking means, and a shoe adapted to anchor on said torque-taking means, means for moving said shoe into contact with the drum comprising a shaft journaled in said torque-taking means, two aligned arms on said shaft straddling said torque-taking means and both rotating with said shaft, and means on which a balanced force is exerted by the concurrent rotation of both of said arms and which in turn exerts an axially centered balanced force against the end of the shoe tending to move it into contact with the drum.

12. In a brake having a rotatable drum, a nonrotatable support member providing torque-taking means, and a shoe adapted to anchor on said torque-taking means, means for moving said shoe into contact with the drum comprising a shaft journaled in said torque-taking means, two aligned arms on said shaft straddling said torque-taking means and both rotating with said shaft, and a forked lever having contact with the web of the shoe at the junction of the forks and having each side thereof in contact with one of said arms.

13. In a brake having a rotatable drum, a nonrotatable support member providing torque-taking means, and two shoes each adapted to anchor on said torque-taking means in one direction of rotation of the drum, means for moving said shoes into contact with the drum comprising a shaft journaled in said torque-taking means, two aligned arms on said shaft straddling said torque-taking means and both adapted to be rotated by rotation of said shaft, and a forked lever straddling the web of one of the shoes and having pivotal contact with the ends of the respective shoes at radially opposite sides of said torque-taking means, each side of the fork being in pivotal contact with one of said arms, whereby concurrent rotation of said arms exerts a force simultaneously on both sides of the forked lever, tending to turn said lever and thereby exerting an axially centered balanced force simultaneously against the end of both shoes tending to move them into contact with the drum.

RUDOLPH A. GOEPFRICH.
BRYAN E. HOUSE.